United States Patent [19]

Abu-Shumays et al.

[11] Patent Number: 5,044,687
[45] Date of Patent: Sep. 3, 1991

[54] SLIDABLE SUN VISORS FOR AUTOMOBILES

[76] Inventors: Ibrahim K. Abu-Shumays; Mary D. Abu-Shumays, both of 1248 Varner Rd., Pittsburgh, Pa. 15227

[21] Appl. No.: 451,938

[22] Filed: Dec. 18, 1989

Related U.S. Application Data

[63] Continuation-in-part of Ser. No. 387,784, Aug. 1, 1989, Pat. No. 4,919,468, which is a continuation-in-part of Ser. No. 158,846, Apr. 2, 1988, abandoned.

[51] Int. Cl.$^5$ .............................................. B60J 3/02
[52] U.S. Cl. .................... 296/97.11; 296/97.4
[58] Field of Search ............ 296/97.11, 97.4, 97.9, 296/97.1; 248/286

[56] References Cited

U.S. PATENT DOCUMENTS

| | | | |
|---|---|---|---|
| 2,122,120 | 6/1938 | Thode | 296/97.4 |
| 2,223,845 | 12/1940 | Davies | 296/97.11 |
| 2,322,898 | 6/1943 | Van Dreser | 296/97.11 |
| 3,226,152 | 12/1965 | Reuther | 296/97.4 |
| 3,857,630 | 12/1974 | Gonzalez | 296/97.4 X |
| 4,765,675 | 8/1988 | Svensson | 296/97.4 |

Primary Examiner—Russell D. Stormer
Assistant Examiner—Joseph D. Pape

[57] ABSTRACT

A sun visor which rotates and slides and is capable of covering top horizontal and slanted parts of a front windshield or a side window of an automobile or a vehicle whenever it is desirable to do so. The rotating motion through a range of angles is facilitated by the rotation of a plate which sits loosely inside the visor. The plate has a clamp part which fits tight enough yet can rotate around the rod axle. This invention also automates the function of the visor in such a way that the motion into an appropriate position can be accomplished (a) manually, (b) by pressing conveniently located buttons connected to the car's electric system and to motors associated with the visors, and (c) by sun striking photocells placed at representative locations around top parts of the front windshield and the front side windows.

4 Claims, 2 Drawing Sheets

SLIDABLE SUN VISORS FOR AUTOMOBILES

This is a continuation-in-part of application Ser. No. 387,784 filed Aug. 1, 1989, now U.S. Pat. No. 4,919,468 which is a continuation-in-part of application Ser. No. 158,846 filed Feb. 22, 1988, now abandoned.

BACKGROUND OF THE INVENTION

1. Field of the Invention

This invention relates to improvements to sun visors for passenger cars and other vehicles aimed at protecting the eyes and enhancing visibility and comfort of the driver, the front seat passenger, and also other passengers.

2. Description of the Prior Art

Current passenger cars and similar vehicles (vans, trucks, etc.) are equipped with a single sun visor on the driver side and another on the passenger side. Each visor is movable and can cover at any one time only the front windshield, or a front side window but not both. As a consequence, a problem arises when driving on a winding road on some early mornings or late afternoons when the driver finds it necessary to frequently switch the position of a visor back and forth between locations along the front windshield and the front side window.

Additional visors are introduced here for increased safety and comfort, especially in certain situations when it is desirable to simultaneously and independently cover critical adjacent locations of both a side window and the front windshield.

The advantage here over prior art is the novelty of the design and the simplicity of manual or automatic operation.

SUMMARY OF THE INVENTION

This invention introduces sun visors for use on the driver's and other passenger's sides of an automobile or a vehicle. This is in order to block sun rays in situations where it is desirable to do so. The objective is to enhance comfort of the driver and comfort of passengers, improve visibility, and contribute to safety.

The visors introduced here can be moved manually, can be moved at the touch of a conveniently located button connected to the vehicle's electric system, and the motion in the latter case can also be triggered when sun rays of a prescribed driver or passenger pre-selected intensity strike conveniently located photocells.

No mention is made here of the material to construct the visors or shades. It may be plastic, woodboard, metal, fabric, etc., or a combination of different materials. It is to be designed to match or contrast with a vehicle's interior decoration. Exact dimensions are not mentioned, since this is a relative matter and can be varied.

BRIEF DESCRIPTION OF THE DRAWINGS

The following drawings illustrate examples of the basic shapes which are the subject of this invention. Component parts shown with the same numbering scheme in different figures are either the same or are alternative embodiments of corresponding structures.

FIGS. 3 and 4 indicate a possible dual function motor 7 to control both the rotation and the sliding motion of the visor. The visor can rotate around, or slide back and forth along its bar 4. Such visors may also be used for the front windshield and for other car windows. FIG. 5 shows a pneumatic (or hydraulic) tube 8 for automating the backwards sliding motion of the visor.

DESCRIPTION OF THE PREFERRED EMBODIMENTS

Figure 1:
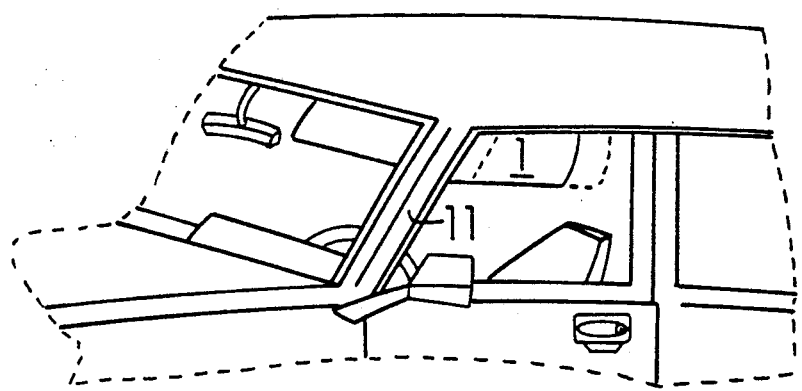
FIG. 1 is a perspective outside view of parts of a car showing visor 1 and a second visor in a position to provide a continuous cover over adjacent corners and top parts of a front windshield and a side window. The dotted lines indicate that visor 1 may be movable back and forth in a horizontal direction. Visor 1 may also be installed for the front windshield and other side windows of a car.
Figure 2:
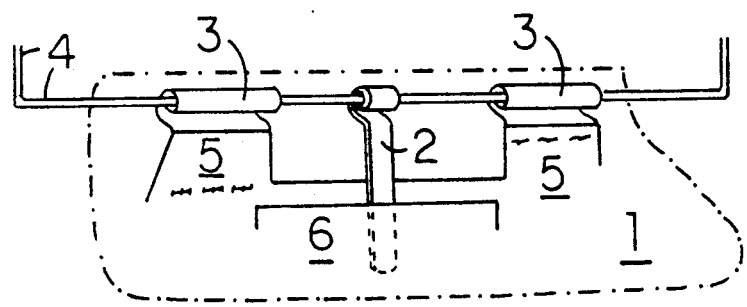
FIGS. 2 to 5 present possible designs of a visor 1 for a front side window (the border of the visor shown by a dashed-dotted curved line) showing fragmentary views of the interior of this visor.

The main objective of this invention is to contribute to safety and at the same time add to the comfort and convenience of a driver and passengers of an automobile or similar vehicle. This is accomplished by making it possible to independently cover top parts of a (front or back) windshield and side windows.

Examples of the preferred embodiments of this invention are shown in FIGS. 1 to 5.

A standard visor available in today's passenger cars sits and can rotate around a rod axle. The rod axle is bent and is typically fastened to a top corner of a car's interior by a bracket unit. The arrangement is such as to make it possible to rotate the rod and its associated visor in a horizontal direction. Thus, as a consequence of the ability to rotate the visor in a vertical direction around its rod axle, and the ability to rotate the rod in a horizontal direction, it is possible to position the visor at a top part of the front windshield (see FIG. 1) or a top part of a front side window.

FIGS. 2 to 5 show four possible designs of visor 1 (the border of the visor shown by a dashed-dotted line). These figures show the interior of this visor and how this visor can rotate around, or slide back and forth along its bar rod 4. In these figures, the cylindrical parts 3 attached to the boards 5 in the interior of the visor are a little loose around the rod 4, thus allowing the visor to slide back and forth along the rod. The plate 2 sits loose and is sandwiched between two boards 5 and 6 in the interior of the visor; this plate 2 has at its end a cylindrical clamp which sits in a fixed horizontal position along the rod. The clamp of the plate 2 surrounds the rod 4, and is tight enough, but still not too tight in order to enable rotation of the plate 2 through a range of angles around the rod 4 by exerting a slight tension on the visor. The clamp part of 2 may sit around a cylindrical plate washer whose function is to ensure sufficient tightness but relieve friction during rotations. In a preferred embodiment, the plate 2 and its clamp part are not permitted to slide along the rod 4. This arrangement results in forcing the visor 1 and the plate 2 to rotate jointly to desired positions, yet makes it possible for the visor 1 to slide along the rod 4 relative to the plate 2. The clamp of the plate 2 makes it possible to hold the visor in any position following partial rotations.

Figure 3:
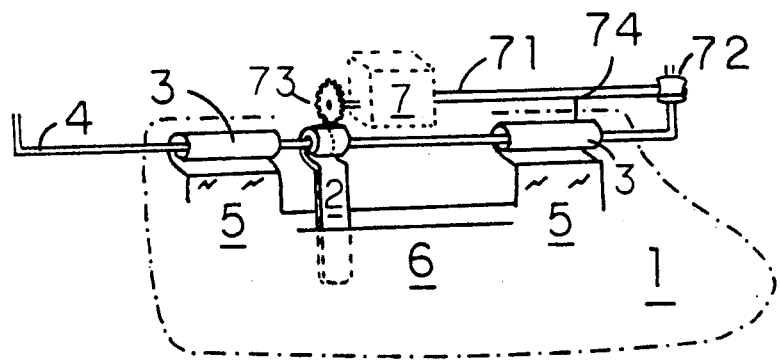
Figure 4:
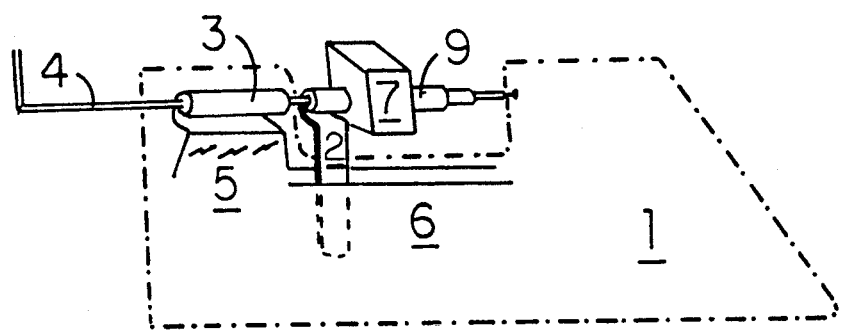
Figure 5:
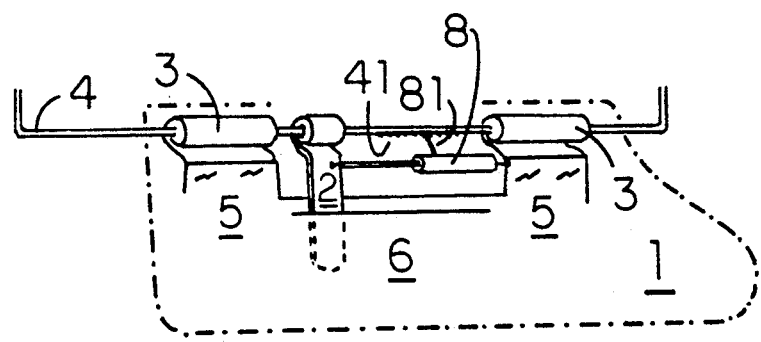

The design of the visor FIGS. 3 to 5 allows for an open part around the plate 2 (see the dashed-dotted line in FIG. 4). As indicated in FIGS. 3 and 4, a motor 7 can be installed adjacent to the cylindrical part of the plate 2 in such a way as to rotate it and thereby rotate the visor 1; the motor shown can independently operate a gear engaging the cylindrical part of 2. The motor in FIG. 3 can also rotate a chain 71 attached to a pulley 72 shown on the bent right end of the rod 4 of FIG. 3. A point 74 in the chain 71 is tied to a point on the visor in order to cause the visor to move forward or backward as the chain undergoes partial rotations. When the motor is running, the spur gear 73 shown engages teeth or slits around the cylinder part of 2. A friction gear can also be used in place of the spur gear 73. In this arrangement a motor-driven friction gear presses directly against and rotates the cylindrical part of 2. The main ideas are apparent from this figure but some relative dimensions are exaggerated.

An alternative arrangement within the technology of the present state of the art is to have the motor and the plate 2 in FIG. 4 in such a way that the motor can independently (a) control the desired sliding motion by allowing for the telescoping of the rod 9 in a manner similar to the way a motor in some of today's cars controls the motion of a radio antenna (and thus automating the sliding motion of the visor), and (b) rotation of the cylindrical part of 2 (and consequently rotation of the visor) to desirable positions.

The motion of visor 1 can be partially automated as in FIG. 3 by installing a pneumatic (or hydraulic) tube 8 of the same class as the door closers very common on screen doors. Here the pneumatic (hydraulic) tube would again be attached firmly to 5 (or to the visor), and would be adjacent to the rod 4. The pneumatic tube would be tightly sealed and would have a piston inside it connected to a rod which extends outside it. The outside end of the piston rod could firmly fixed to the plate 2 which does not move horizontally. In this case a portion of the rod 4 would have a zigzag part 41 on its bottom side in order to engage an extended plate 81 attached to the tube to prevent the visor from sliding back along the rod 4 while the visor is in a lowered used position. The piston rod is released when the visor is raised, causing the visor to automatically slide away from the front windshield, thus reducing interference between the rest positions of adjacent visors and making it possible to cover a slanted top part of a side window adjacent to a pillar 11 between a side window and a windshield. The orientation of the pneumatic tube in FIG. 5 (where the tube and piston rod are tied) can clearly be reversed. The pneumatic tube may be provided with a screw which adjusts piston rod speed. Alternatively, the pneumatic (hydraulic) tube which rotates with the visor may have teeth which occupy a small strip along (but do not go all the way around) the outside of the tube. When the visor is covering a window, the teeth of the pneumatic (hydraulic) tube would become engaged with a spur gear wheel which can spin freely only in one direction. The arrangement is such that the visor 1, when covering a front window, can easily be pushed towards the front windshield and the engagement of the teeth of the pneumatic (hydraulic) tube with those of the spur gear would prevent the visor from going backwards. If however the visor is rotated partially away from a side window, the teeth of the pneumatic (hydraulic) tube would become disengaged from the teeth of the spur gear, thus freeing the movement of the piston inside the pneumatic (hydraulic) tube and automating backwards movement of the tube and its associated visor, in much the same way which results in the automatic closing of screen doors.

The sliding motion of the visor may also be needed in order to provide for (a) a proper rest position, and (b) for a complete cover over a slanted top part of a side window adjacent to a pillar 11 during a lowered use position. Adjusting the relative horizontal position of the visor may also prove advantageous when sun rays strike from certain positions.

One of the visors shown in FIGS. 2 to 5 can be added above each side window of older automobiles and vehicles. While we have illustrated and described several embodiments of our invention, it will be understood that these are by way of illustration only and that various changes, extensions and modifications may be contemplated in this invention and within the scope of the following claims.

We claim:

1. A sun visor for use to cover a corner and top part of a window of an automobile;
   said sun visor has a cylindrical part which surrounds and can rotate freely around, and can slide back and forth freely along a rod axle fixed in a horizontal position near an interior top part of a side window;
   a plate sits loose inside and is sandwiched between two boards in the interior of said sun visor; said plate can rotate together with said sun visor around, but does not slide along said rod axle; the plate has at its end a cylindrical clamp which sits in a fixed horizontal position along said rod axle; said cylindrical clamp surrounds said rod axle, and is tight enough but still not too tight in order to enable rotation of the plate around said rod axle by exerting a slight tension on said sun visor; the sun visor and the plate rotate jointly through a range of angles around said rod axle; the clamp of said plate makes it possible to hold the visor in place following partial rotations.

2. A sun visor as recited in claim 1, wherein said sun visor can be actuated manually and can also be actuated by motor means.

3. A rotatable and slidable sun visor as recited in claim 1 wherein the sliding motion along one of two opposite possible horizontal directions can be actuated by a pneumatic tube means.

4. A rotatable and slidable sun visor as recited in claim 1 wherein the sliding motion along one of two opposite possible horizontal directions can be actuated by a hydraulic tube means.

* * * * *